R. WALKER.
ELEVATING AND BUNCHING ATTACHMENT FOR MOWING MACHINES.
APPLICATION FILED JAN. 24, 1911.
1,021,023.
Patented Mar. 26, 1912.
3 SHEETS—SHEET 1.
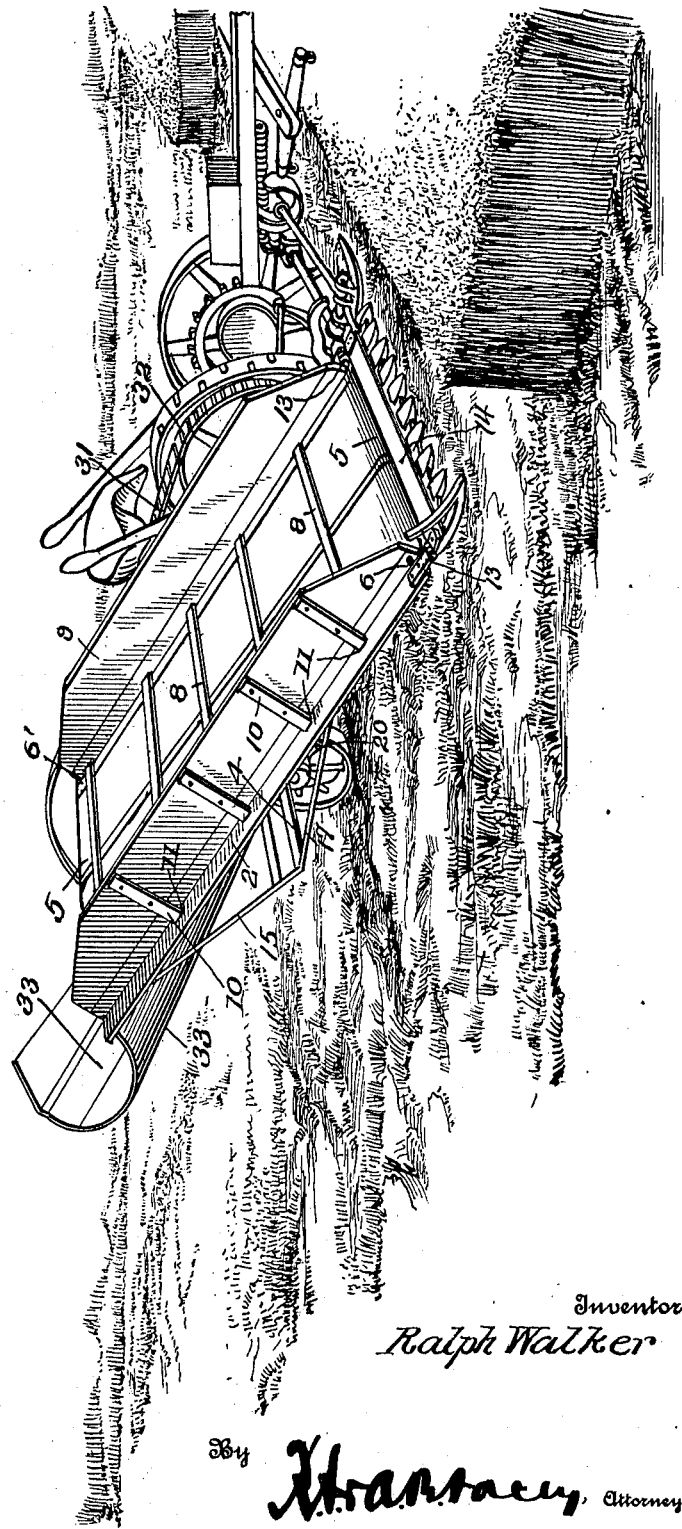

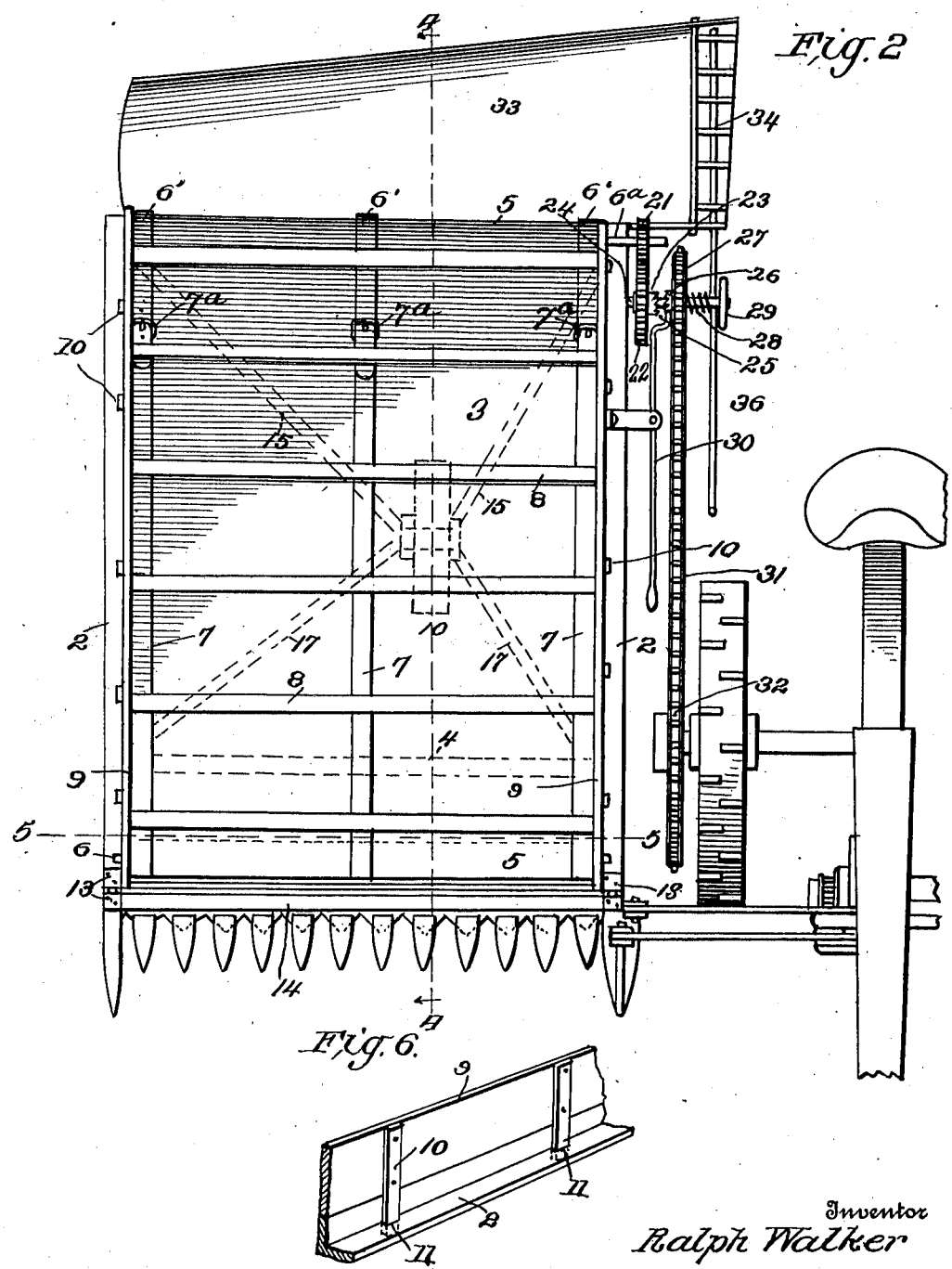

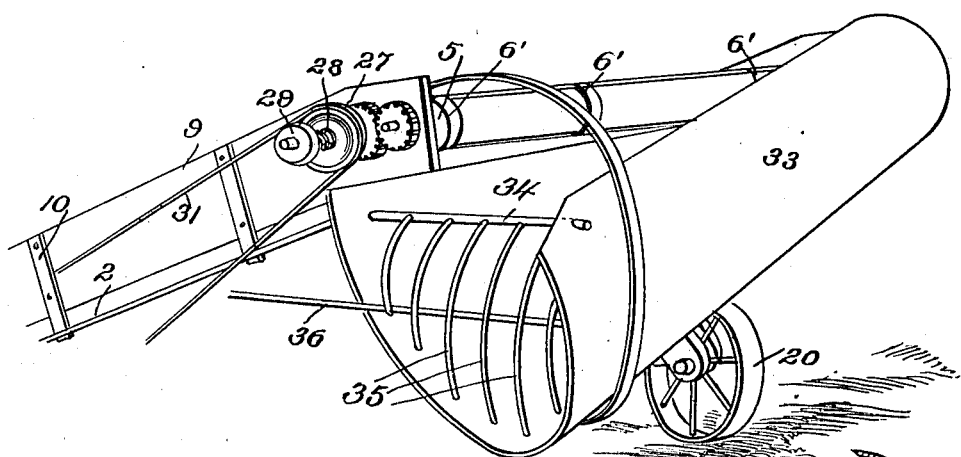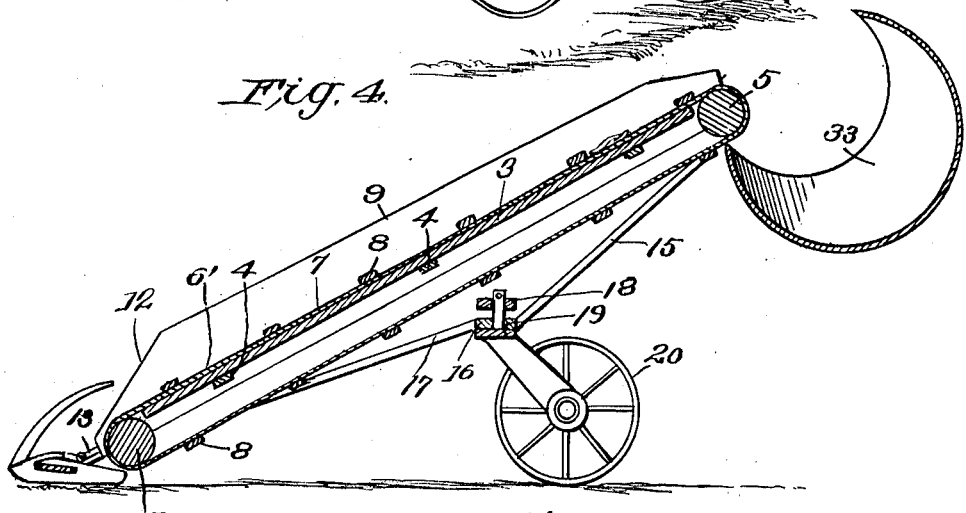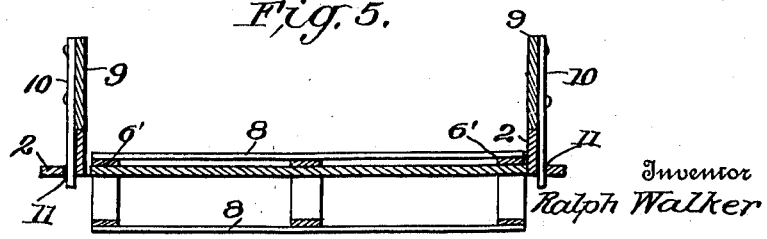

UNITED STATES PATENT OFFICE.

RALPH WALKER, OF WESTHOPE, NORTH DAKOTA.

ELEVATING AND BUNCHING ATTACHMENT FOR MOWING-MACHINES.

1,021,023.  Specification of Letters Patent.  Patented Mar. 26, 1912.

Application filed January 24, 1911. Serial No. 604,456.

*To all whom it may concern:*

Be it known that I, RALPH WALKER, citizen of the United States, residing at Westhope, in the county of Bottineau and State of North Dakota, have invented certain new and useful Improvements in Elevating and Bunching Attachments for Mowing-Machines, of which the following is a specification.
My invention relates to agricultural machinery, and particularly to an attachment for mowing machines, whereby timothy, clover, alfalfa, and other like grasses or grain after being cut by the mowing machine may be delivered in light loose windrows or bunches on top of the stubble to one side and directly behind the main body of the mower for the purpose of permitting the sun and air to have full play in curing the hay or grain.

The primary object of my invention is the production of a device of this character which is of a very simple, strong and effective character, which shall so deliver the hay or grain cut by the mower as to remove the objectionable feature of having the horses trampling over the hay or grain during the next succeeding round, and eliminating the necessity of raking or teddering the hay or grain.

A further object is to construct a device of this character so that the hay or grain shall not be dragged through the stubble in the operation of elevating and delivering it, which dragging of the hay or grain through the stubble causes shelling of the seed.

A further object is to make the device so light that no material increase in draft will be caused.
Other objects will appear in the course of the following description.

My invention is illustrated in the accompanying drawings, wherein:—

Figure 1 is a perspective view of my improved attachment in conjunction with a mowing machine. Fig. 2 is a plan view thereof, a portion of the mowing machine being shown. Fig. 3 is a perspective view of the rear end of my attachment. Fig. 4 is a vertical section on the line 4—4 of Fig. 2. Fig. 5 is a transverse section on the line 5—5 of Fig. 2. Fig. 6 is a fragmentary detail perspective view of one of the angle-iron frame-bars and a side-board connected therewith.

Corresponding and like parts are referred to in the following description and indicated in all the views of the accompanying drawings by the same reference characters.

Referring to these figures it will be seen that the invention broadly considered, includes an elevating device, or carrier, adapted to be attached to the finger-bar of a mowing machine, and in connection with this elevator, the provision of a transversely extending side delivery chute attached to the rear of the elevator. It further consists in combination with the elevator and chute, as above described, of means co-acting with the chute for preventing the delivery of material from the chute, except at desired points, and also the provision of means whereby the elevating attachment may be drawn out of operation when desired, and of means for preventing the reverse action of the elevating attachment when the mowing machine moves rearward.

Referring particularly to the drawings it will be seen that in the embodiment of my invention disclosed, I have provided a supporting framework comprising two parallel oppositely placed longitudinally extending supporting bars 2, preferably formed of angle iron, the angle iron being so placed that one flange thereof extends vertically and the other horizontally, the vertical flanges of the angle irons being adjacent to each other, and the horizontal flanges extending outward. Supported upon the angle iron supporting bars 2 is a deck 3, preferably formed of sheet iron. This deck is supported by means of transverse supporting bars 4. There may be as many of these bars 4 as necessary, but I have shown three for the purpose of supporting the deck, one located at each end of the frame and one located in the middle. Mounted at the upper and lower ends of the side-bars 2 are the elevator rollers 5 which are preferably, though not necessarily made of wood, and are mounted on shafts 6 which extend through the vertical flanges of the side-bars. I of course, do not wish to be limited to any particular means whereby these rollers 5 are supported. Preferably, however, the shafts of the rollers are mounted in suitable journal boxes attached to the side-bars 2. Extending over the rollers 5 are the conveyer belts 7. There are preferably three of these belts, one at each end of the rollers and one in the middle. These belts are each provided with buckles 7ᵃ, whereby the belts may be taken up or loosened to permit the proper adjustment of the belts. These belts pass over the face of the sheet iron deck 3 and carry a plurality of transverse slats 8 which are attached in any suitable manner to the belts. It will be obvious that as the belts move upward over the face of the deck 3 that the slats will carry up material delivered to the carrier.

Detachably mounted on the side-bars 2 are the side-boards 9 which are removable from the side-bars. Preferably these boards 9 are provided with downwardly projecting pins 10 which fit into openings 11 formed in the horizontal flanges of the side-bars 2. The lower ends of these side-boards are tapered as at 12. In order to provide for a proper attachment to the finger-bar of a mowing machine I provide flexible connections between the lower ends of the side-bars 2 and the finger-bar. For this purpose I have shown 2 as being provided with hinges 13 which are permanently attached to the side-bars 2 and which are thereby attached in any suitable manner to the finger-bar 14 of the mowing machine. This connection permits the elevator to rise and fall with irregularities in the ground and also permits the cutter-bar to be raised or lowered as usual to adjust the cut of the machine.

In order to support the elevator, I provide it on its under side with a caster-wheel which is so mounted that it may turn entirely around in a horizontal plane. Preferably for the support of this wheel I provide the inclined braces 15 illustrated in Fig. 4 which are attached at their outer ends to the side-bars 2 and which extend inward and downward toward each other. These braces are connected by a transverse brace 16. I also provide the forwardly and outwardly inclined braces 17 which are attached at their inner ends to the transverse brace 16 and at their outer ends to the side-bars 2. The braces 15 are connected by a brace 18 so as to provide a suitable bearing for the pintle 19 of the caster-wheel 20. The pintle 19 of the caster-wheel is rotatably mounted in the braces 16 and 18 so that the wheel may have free rotatable movement.

As a means for driving the elevating mechanism I provide the shaft 6ᵃ of the uppermost roller 5 with a gear wheel 21 which meshes with a gear-wheel 22 attached to a sleeve 23 rotatably mounted on a fixed shaft 24. The outer end of this sleeve is formed with ratchet-teeth 25 and mounted on the shaft 24 is a sleeve 26 which has a sliding movement on the shaft 24 and to which is attached the sprocket wheel 27. The spring 28 surrounds the shaft 24 and bears at one end against a head 29 and at its other end bears against the gear-wheel 27 to force the gear-wheel and the sleeve 26 inward so that the teeth on the sleeve 26 shall engage with the ratchet-teeth 25. It will thus be seen that I have provided a clutch engagement between the sprocket wheel 27 and the gear-wheel 22. For the purpose of drawing the sleeves 23 and 26 out of engagement with each other, I provide the lever 30 which is preferably attached in any suitable manner to the frame of the machine and whose inner end is in engagement with the sleeve 26. The free end of the lever 30 extends upward into convenient position to be operated by the driver of the machine. Passing over the sprocket wheel 27 is a sprocket chain 31 which in turn passes over a sprocket wheel 32 which is attached to one of the traction wheels of the mowing machine. Power is thus transmitted from the traction wheel of the mowing machine to the sprocket wheel 27 and from this sprocket wheel power is transmitted to the uppermost roller 5 to cause the elevation of the conveyer belts. It will be seen that upon any rearward movement of the mowing machine the teeth on the sleeve 26 will escape from any engagement with the teeth on the sleeve 23 and that thus the gear-wheel 22 will not be actuated. Any forward movement of the mowing machine will, however, cause the actuation of the gear-wheel 22, gear-wheel 21 and the elevating mechanism.

Mounted at the upper end of the elevator and beneath the roller 5 is the transversely extending chute 33. This chute is inclined downward so that it delivers material immediately behind the mowing machine. The chute is relatively contracted at its upper end and expands toward its lower end and may be supported upon the rear end of the frame in any suitable manner. Extending across the delivery end of the chute is a rod 34 which carries a plurality of curved fingers 35 which extend down to the bottom of the chute. Extending across and attached to these curved fingers is a spacing rod 36 which extends upward to any convenient point where it may be easily handled by the operator on the mowing machine. By raising this rod 36 the fingers may be lifted and the material within the chute will be allowed to be discharged therefrom.

In the practical operation of my invention it will be seen that as the grass or grain is cut that it will fall upon the elevating devices and be carried upward and discharged into the chute 33. It will collect into this until such time as the fingers 35 are raised when it will be discharged in a bunch immediately behind the mower, and at such distance as the operator may determine.

The device is adapted to elevate and windrow or bunch, timothy, clover, alfalfa, wheat, oats, barley, flax, peas, beans or any kind of hay or grain, and it will deliver the same in light loose windrows or bunches, on top of the stubble, and to one side and directly behind the main body of the mower, thus allowing the sun and air to have full play in curing the hay or grain and entirely removing the objectionable feature of having the horses tramping over the hay or grain during the succeeding round or while raking or teddering.

It will be seen that my attachment receives the hay or grain immediately it is cut and therefore does not drag the hay or grain through the stubble. My device has a decided advantage over other windrows and bunchers in which, in order to collect the hay or grain in bunches drag the hay or grain through the stubble, thus causing the shelling of the seed.

My invention attempts to do away with the necessity of using hay-rakes, side delivery rake or tedders, as the attachment leaves the hay or grain in loose windrows or bunches and on top of the stubble and in such condition that it may be easily cured by the sun and air.

The attachment is so light that it will cause no material increase in the draft of the mowing machine and particularly in view of the fact that it does not drag the cut hay or grain through the stubble.

It will be noticed that the caster wheel is placed nearer to the gear side of the machine than it is to the outside thereof. This is done in order to guard against overbalancing of the machine by the pull on the shaft and the weight of the load in the lower end of the chute when bunching hay or grain.

Having thus described the invention what is claimed as new is:—

1. The combination with a mowing machine including a traction wheel and a finger bar, of a supporting frame hingedly connected to the finger bar, a caster wheel mounted beneath the middle of the frame for free rotation in a horizontal plane, an upwardly inclined floor carried by the frame and extending at right angles to the finger bar, conveyer rollers disposed at the upper and lower ends of the floor, elevator belts passing over said rollers, the belts being connected by transverse members, a transversely extending, downwardly inclined chute downwardly widening toward its lower end and supported beneath the upper end of the elevator floor, a plurality of fingers extending down into the chute at the lower end thereof, a rock shaft extending across the lower end of the chute to which said fingers are attached, an operating rod rigidly connected to said fingers and extending forward whereby the fingers may be raised, gearing operatively connecting the uppermost of the elevator rollers to the traction wheel of the mowing machine, and means for throwing said gearing into or out of engagement with said traction wheel.

2. In a mowing machine attachment of the character described, an upwardly inclined wheeled frame, an endless conveyer mounted upon said frame, a transversely extending downwardly inclined chute supported at the rear end of the endless conveyer, said chute being semicircular in cross section and widening toward its lower end, a circular support for the lower end of the chute disposed upon the frame and encircling the chute, a transverse rock shaft passing through the upper margins of the side walls of the chute at the lower end thereof, a plurality of depending fingers attached to said rock shaft, and a rigid operating rod attached to said fingers and extending forward.

3. The combination with a mowing machine including a traction wheel and a finger bar, of a supporting frame hingedly connected to the finger bar and extending upward and rearward therefrom parallel to the traction wheel of the machine, a caster wheel mounted beneath the frame for movement in a horizontal plane, said caster wheel being disposed between the axial center of the frame and the mowing machine, an endless conveyer supported upon the frame, a chute supported at the upper end of the frame extending transversely thereof below the upper end of the endless conveyer, pivoted fingers normally closing the lower end of the chute, and means whereby the fingers may be lifted to permit the contents of the chute to be dumped.

4. The combination with a mowing machine having traction wheels, a finger bar and a sprocket wheel operatively connected to the traction wheels, of a wheeled supporting frame hingedly attached to the finger bar and extending upward and rearward therefrom, oppositely disposed upper and lower conveyer rollers, an endless conveyer supported on said rollers, a gear wheel operatively connected to the uppermost roller, a gear wheel engaging the first named gear wheel and provided with an outwardly extending sleeve having ratchet teeth, a sprocket wheel having a sleeve formed with ratchet teeth engaging the teeth of the first named sleeve, a spring for holding the ratchet teeth in engagement, manually operated means for shifting the sprocket wheel and sleeve out of engagement with the first named sleeve and its gear wheel, a sprocket chain passing over said sprocket wheel to the sprocket wheel on the mowing machine, a transversely disposed chute mounted immediately beneath the rear end of the conveyer, said chute being downwardly inclined toward the rear of the mowing machine, pivoted fingers depending into the lower end of the chute, and a rod extending from said fingers whereby they may be operated independently of the gear disengaging means.

In testimony whereof, I affix my signature in presence of two witnesses.

RALPH WALKER. [L. S.]

Witnesses:
 PERRY COMPTON,
 ROBT. WALKER.

Copies of this patent may be obtained for five cents each, by addressing the "Commissioner of Patents, Washington, D. C."